Patented Sept. 5, 1922.

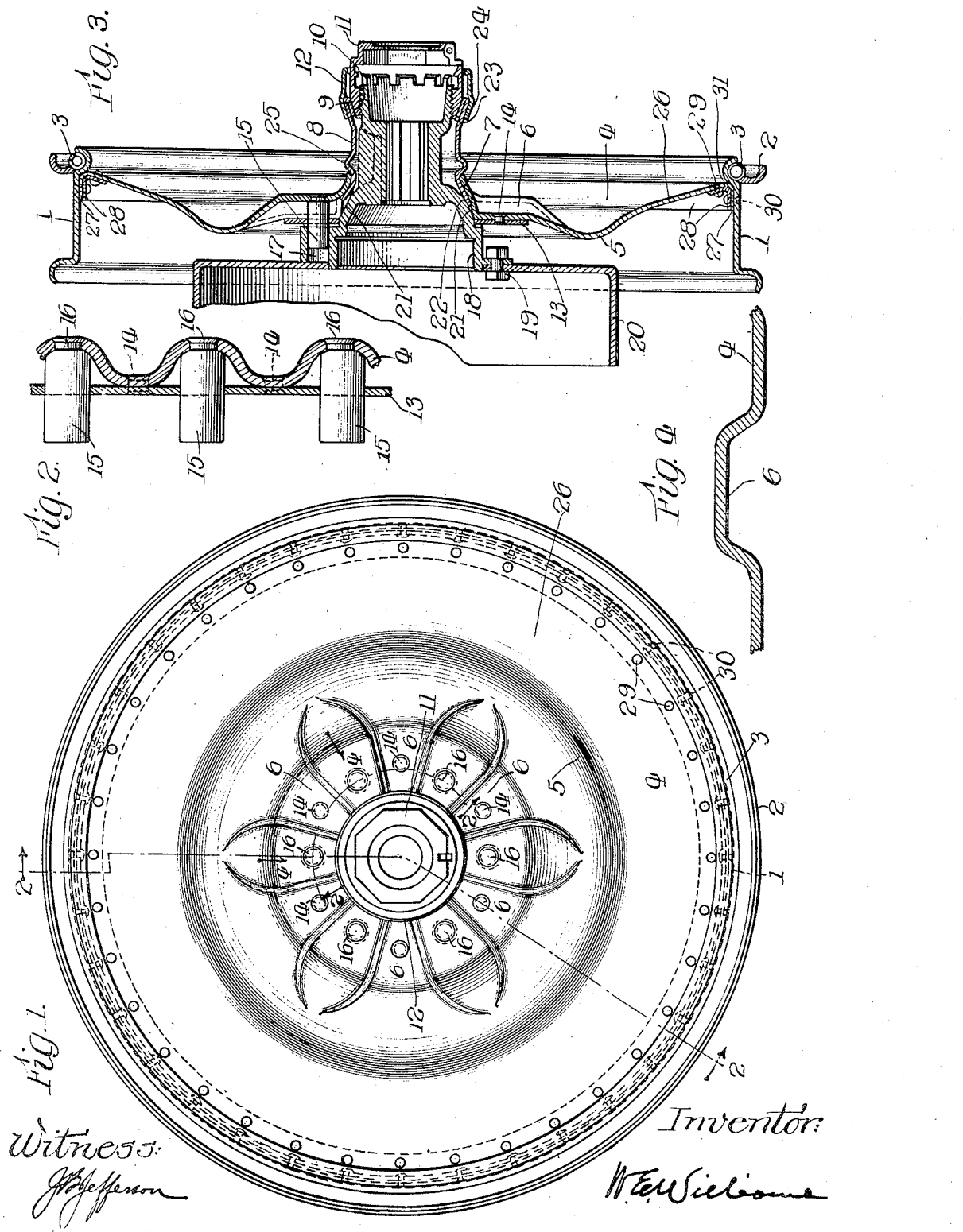

1,427,926

UNITED STATES PATENT OFFICE.

WILLIAM ERASTUS WILLIAMS, OF CHICAGO, ILLINOIS.

DEMOUNTABLE WHEEL FOR AUTOMOBILES.

Application filed September 10, 1919. Serial No. 322,778.

*To all whom it may concern:*

Be it known that I, WILLIAM ERASTUS WILLIAMS, a citizen of the United States, resident of Chicago, county of Cook, and State of Illinois, have invented a new and useful Improvement in Demountable Wheels for Automobiles, of which the following is a specification.

My invention relates to a disk type of wheel which is demountable substantially in the same manner as is customary with wire wheels.

The object of my invention is to provide a disk wheel that will be elastic in type and will be cheaply made and will be stiff and rigid where it joins the hub, and that can be made out of the thinnest single sheet practicable and be demounted as readily as any other wheel, together with several detailed merits as will be described later.

The invention is set forth in the claims.

Reference will be had to Figure 1 which is a front elevation of the wheel. Figure 2 is a sectional circular detail on line 2—2 of Figure 1. Figure 3 is a section on the broken line 2—2, Fig. 1. Figure 4 is a vertical sectional elevation on line 4—4 of Figure 1.

In the drawing 1 indicates the rim of the wheel here shown as in a form adapted to carry what is known as a "straight side" rubber tire, but this rim may be made to conform to any suitable shape for any suitable tire.

The rim here shown is what is known as a quick detachable pattern, whereon the flange 2 may be quickly removed by taking out the elastic element 3.

The main web or body of my wheel is composed of the disk 4 pressed into the shape as shown, having the swell or bulge 5 about midway between the hub and the rim.

This disk 4 is tapered in thickness from a thin edge at its outer rim to the thickest portion near the hub and immediately around the hub the disk is further strengthened by a series of short corrugations 6. The corrugations 6 terminate at or near the swell 5 at the outer points and they terminate in a projecting flange 7 at the hub.

The flange 7 of the disk embraces and is secured to a tubular extension 8 which terminates in and is folded inward at 9 in contact with the inclined face 10 of the hub nut 11. A secondary cap or end 12 is fixed onto the tubular extension 8 and thus the disk 4, extension 8 and cap 12 together with the rim 1 become a unitary member that is mounted and demounted as desired in the case of demountable wheels.

On the inner side of the disk 4 and covering the corrugations 6 there is a flat ring 13 riveted at 14 to the valleys of the corrugations 6. Studs 15 pass through holes in the ring 13 and are riveted at 16 to the summits of the corrugations 6 and these studs enter into holes 17 of the normal hub 18 of the vehicle. The hub shown in the drawings is the rear hub and is substantially the same hub that is employed with a wire demountable wheel. The hub 18 is bolted or otherwise fastened at 19 to the brake drum 20, as this is the rear wheel. Outside of the brake drum feature the forward wheel is substantially the same.

The load of the wheel is transmitted to the hub at the inclined face 21 of the hub and the inclined end 23 of the hub nut. Against the surface 21 there bears the inner end 22 of the tubular extension 8 and the inner ends of the corrugations 6. The flange 7 at the termination of the corrugations 6 butts against the swell or rib 25 of the tube 8. At the inclined end 23 of the nut the thrust load and bursting pressure at this point are borne by the two thicknesses 9 of the tube 8 and the flange 24 of cap 12. The disk and tube 8 are assembled when the end 22 of the tube is straight and it is swaged out to fit snugly into the corrugations 6 and flange 7. I may, as desired, weld or rivet these parts together through the body of flanges 7 and 22 or weld seams at the edges of the flanges.

The cap 12 is secured to the end 9 of the tube 8 by swaging in the end 24 of the cap.

The valleys of the corrugations 6 are located substantially in the plane of the center line of the load or tread of the wheel and the bulge 5 comes within this center line plane and the rim section 26 extends forward of the center plane.

At the margin of the disk 4 a flange 27 is turned and reinforced by a ring 28 fixed to the disk by rivets 29, and the flange, ring, and rim 1 are rigidly connected by rivets 30, whereby the disk is securely fixed to the rim in such a manner as to utilize tension as in wire wheels and compression as wheels provided with spokes.

The outer flange of my disk 4 for a distance in from its margin in vertical section is not in a straight line but inclined to the plane of the wheel and this is the thin portion of the disk and thus constructed without bulges or swells or the bends necessarily produced by change in shape in this section, were any to be made here, relieves this portion of the metal from undue bending moments and permits the elastic bending moment to be transmitted almost wholly to the thicker portion at the bulge 5 which is thick enough to stand a load of the necessary bending moments of springlike character that develop in the use of the wheel.

In a wheel of this type, wherein a flange is turned over at the rim, which flange is desirable in aiding in obtaining a tension effect, it is desirable that the shape of the rim contact should reinforce the disk's edge where the curve of bending over the flange of the disk takes place and thus the type of the rim that may be used with this type of disk may aid in the fastening of the disk to the rim. The rim here shown not only performs the ordinary function of a quick detachable rim, but the edge used reinforces the disk at the curved margin and strengthens the disk at this joint without making necessary any change in the desired form for the rim itself for this peculiar construction. Obviously there is in this instance a combination and co-operation of the peculiar rim and disk.

The elastic member 3 is a spring coil and thus is more readily removed than a solid member and it has a greater diameter for a given weight, making it suitable to aid in forming a proper curve at 31 for joining the disk and rim.

By the construction shown I am able to build an extremely light single disk wheel that is most easily washed and more easily demounted than any other type of disk wheel with which I am acquainted.

What I claim is:

1. In a wheel of the class described, a single disk wheel having a smooth conical surface around its outer area merging into a radially corrugated stiffened area around the hub and this region joined to a tubular extension, forming a unitary disk and hub.

2. A single disk wheel having a smooth, conical, peripheral zone merging into a radially corrugated hub zone which is joined to a tubular extension to form a unitary disk and outer hub, and further having a distinct inner hub secured to said disk and extension by distinct means.

3. A single disk wheel having a broad smooth circumferential zone integrally connected with a central zone which has radial stiffening corrugations and is rigidly connected with a lateral, tubular hub extension.

4. A single disk wheel having a smooth conical outer zone merging in an elastic annular swell integral with a radially corrugated central zone which is connected with a sleeve-like hub extension to form a unitary structure.

5. In a wheel composed of a rim, a disk web and a hub, said disk having a smooth surfaced outer area for the major portion of the web and this area merging into a series of radial corrugations around the hub, a ring connecting the summits of the corrugations around the hub.

6. A demountable wheel composed of rim, web and hub, said web composed of a single disk smooth surfaced around its outer larger marginal area and corrugated for stiffness around the hub area; with means for connecting the corrugated area with an internally arranged hub.

7. A demountable wheel disk having in its hub region an annular series of rigid lateral projections adapted to permit free lateral adjustment of the plane of the disk while the projections engage another member and resist relative rotary movement of the two members.

8. A disk wheel composed of a rim, and a disk web having around a central opening a laterally projecting annular flange adapted to telescope a suitable hub, said web composed of a disk, smooth surfaced in its outer area and corrugated for stiffness around said lateral flange only.

9. A disk wheel composed of a single disk, a rim secured thereto and a cylindrical hub, also secured thereto and said disk secured to the rim forward or outward from the central load plane of the wheel and thence dished inward to the other side of said plane and thence dished backward into the region of the load plane and with a hub extending outward from the load plane.

10. A disk wheel composed of a rim, a disk web and a cylindrical hub, said disk secured to the rim, forward or outward from the central load plane and from thence dished inward to and beyond the central load plane and thence dished backward to the region of the load plane and secured to the hub.

11. A demountable disk wheel having a single disk web, smooth on its outer area and merging into relatively short radial corrugations around the hub and said corrugations tapering out on inclines that fit an inclined bearing surface on the inside hub.

Signed at Chicago, in the county of Cook and State of Illinois, this eighth day of September, 1919.

WILLIAM ERASTUS WILLIAMS.

Witnesses:
JOHN B. JEFFERSON,
B. J. BERNHARD.